(12) United States Patent
Yang et al.

(10) Patent No.: US 10,488,544 B2
(45) Date of Patent: Nov. 26, 2019

(54) METHOD, APPARATUS AND SYSTEM FOR ARRANGING SURVEY POINTS IN FIELD OPERATION WITH GROUND ELECTROMAGNETIC INSTRUMENT

(71) Applicant: Institute of Geology and Geophysics, Chinese Academy of Sciences, Beijing (CN)

(72) Inventors: Yongyou Yang, Beijing (CN); Zhongxing Wang, Beijing (CN); Tianxin Zhang, Beijing (CN); Renzhong Pei, Beijing (CN); Wenxiu Zhang, Beijing (CN); Qingyun Di, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 16/178,217

(22) Filed: Nov. 1, 2018

(65) Prior Publication Data

US 2019/0129055 A1    May 2, 2019

(30) Foreign Application Priority Data

Nov. 2, 2017 (CN) .......................... 2017 1 1063112

(51) Int. Cl.
  *G01V 3/17* (2006.01)
  *G01C 15/02* (2006.01)
  (Continued)

(52) U.S. Cl.
  CPC .............. *G01V 3/17* (2013.01); *G01C 15/02* (2013.01); *G01V 3/081* (2013.01); *G01V 3/088* (2013.01); *G01V 3/36* (2013.01); *G01V 3/38* (2013.01)

(58) Field of Classification Search
None
See application file for complete search history.

(56) References Cited

U.S. PATENT DOCUMENTS 6,437,708 B1 * 8/2002 Brouwer ................ G01C 15/02
                                                                221/1
9,460,554 B2 * 10/2016 Azulai .................... G06T 19/00
2017/0097435 A1   4/2017 Hull et al.

FOREIGN PATENT DOCUMENTS

CN   103809204 A   5/2014
CN   104597506 A   5/2015
(Continued)

*Primary Examiner* — Paresh Patel
(74) *Attorney, Agent, or Firm* — Novick, Kim & Lee, PLLC; Allen Xue

(57) ABSTRACT

In a system for arranging survey points in field operation with a ground electromagnetic instrument, the position information of survey lines and survey points are planned and downloaded to an aircraft in advance. The survey lines and one survey point among survey points planned in advance is selected and the coordinate information of the survey point is acquired. The aircraft is controlled to fly to the physical geographic location of the survey point according to the coordinate information of the survey point in conjunction with positioning information acquired in real time. The aircraft hovers above the physical geographic location of the survey point and projects a predetermined indication mark to the ground. The detection instrument and electric field sensor are deployed at a first position indicated by the indication mark, and the magnetic field sensor is deployed at a second position; such a process is repeated till all of the planned survey points are arranged.

9 Claims, 4 Drawing Sheets

(51) Int. Cl.
*G01V 3/08* (2006.01)
*G01V 3/38* (2006.01)
*G01V 3/36* (2006.01)

(56) References Cited

FOREIGN PATENT DOCUMENTS

| | | | |
|---|---|---|---|
| CN | 107272704 A | 10/2017 | |
| CN | 108008448 A | 5/2018 | |
| CN | 108267794 A | 7/2018 | |

\* cited by examiner

METHOD, APPARATUS AND SYSTEM FOR ARRANGING SURVEY POINTS IN FIELD OPERATION WITH GROUND ELECTROMAGNETIC INSTRUMENT

CROSS REFERENCE TO RELATED APPLICATIONS

The present application claims the benefit of the Chinese patent application No. 201711063112.1, filed on Nov. 2, 2017 before the Chinese Patent Office, entitled "Ground Electromagnetic Instrument Field Work Measuring Point Arrangement Method, Device and System", the contents of which are incorporated herein by reference in their entirety.

FIELD OF THE INVENTION

The present invention relates to the geological survey field, particularly to a method, an apparatus and a system for arranging survey points in field operation with a ground electromagnetic instrument.

BACKGROUND OF THE INVENTION

Ground electromagnetic instruments are a sort of instruments that calculate formation resistivity by measuring surface electrical field and magnetic field signals, and are widely applied in mineral exploration, oil and gas survey, subterranean water, and geothermal heat domains, etc. During field operation with a ground electromagnetic method, usually several survey lines are arranged at an equal interval (the distance between two adjacent survey lines is usually hundreds of meters) and several survey points are arranged on each survey line at an equal interval (the spacing between adjacent survey points is usually hundreds of meters), and the instrument carries out measurement at the survey points sequentially, as shown in FIG. 1.

The types, quantities, and positions of the sensors connected with the instrument may vary, depending on the specific measurement method. For example, in the case that a magnetotelluric/audiomagnetotelluric (MT/AMT) method is used, the instrument usually is connected with 4 electric field sensors distributed in 4 orientations of the instrument at equal distance to the instrument, and is connected with 3 magnetic field sensors disposed in a way that the 3 magnetic field sensors are orthogonal to each other, as shown in FIG. 2.

It is seen from the above description: during field operation with a ground electromagnetic instrument, the survey point positioning and orientation problem involved in the survey point arrangement procedure mainly involves determination of positions of survey points on survey lines, i.e., determination of deployment positions of the instrument, and determination of the positions of electric field sensors and the orientations of magnetic field sensors among the sensors connected with the instrument at the survey points.

At present, during field operation, the engineering staff usually manually determine the positions of the survey points of the instrument and the positions and orientations of the sensors connected with the instrument, specifically as follows: before the field operation, the positions and directions of survey lines are planned and designed and the positions of survey points on the survey lines are determined in an indoor environment, and the coordinate values are saved; before the instrument is deployed, persons specially assigned for the work hold a satellite navigation receiver and approach to the preset survey points while observing the coordinate values of the positions; after the instrument is deployed, the engineering staff utilize tools such as handheld compass or forestry compass to determine the directions and carry out setting-out with a tape to determine the deployment points of the electric field sensors, and then use a compass to determine the orientations of the magnetic field sensors, and use a level gauge to determine the levelness.

Generally speaking, the positions of the survey points are found out and the positions and orientations of the sensors are determined manually by the engineering staff. Consequently, the operating efficiency is low, and it is difficult to ensure the accuracy owing to human factors such as the skill and experience of the engineering staff, etc.

CONTENTS OF THE INVENTION

In view of the above-mentioned problems in the prior art, in the embodiments of the present invention, a method, an apparatus and a system for arranging survey points in field operation with a ground electromagnetic instrument are provided.

In a first aspect, the present invention provides a method for arranging survey points in field operation with a ground electromagnetic instrument, which comprises:

S1. planning for position information of survey lines and survey points and downloading the position information to an aircraft in advance;

S2. selecting the survey lines and one survey point among survey points planned in advance, and acquiring coordinate information of the survey point;

S3. controlling the aircraft to fly to the physical geographic location of the survey point according to the coordinate information of the survey point in conjunction with positioning information acquired in real time while projecting a first type of predetermined indication mark to the ground continuously in the process of flight to guide the engineering staff to move forward;

S4. controlling the aircraft to hover above the physical geographic location of the survey point and project a second type of predetermined indication mark to the ground to guide the engineering staff to deploy a data acquisition and recording device;

S5. controlling the aircraft to sequentially fly to deployment points of electric field sensors configured for the data acquisition and recording device, hover above the deployment points, and project the second type of predetermined indication mark to the ground to guide the engineering staff to deploy the electric field sensors;

S6. controlling the aircraft to sequentially fly to deployment points of magnetic field sensors configured for the data acquisition and recording device, hover above the deployment points, and project the second type of predetermined indication mark to the ground to guide the engineering staff to deploy the magnetic field sensors; and S7. repeating the steps S2-S6, till all planned survey points are arranged.

Optionally, the method further comprises:
recording the position information of the data acquisition and recording devices, electric field sensors, and magnetic field sensors at all of the planned survey points, by the aircraft, after the arrangement.

Optionally, the first type of predetermined indication mark is a straight cursor configured to guide the engineering staff to move forward; the second type of predetermined indication mark is a cross cursor composed of two straight line segments that are different from each other in length, wherein, the straight line segment in greater length is used for differentiating the orientation, and the center point of the cross cursor is a positioning point; specifically, the second type of predetermined indication mark is configured to indicate that the detection instrument and the electric field sensors should be positioned at the center of the indication mark and the magnetic field sensors should be positioned in the direction of the straight line segment in greater length.

In a second aspect, the present invention provides an apparatus for arranging survey points in field operation with a ground electromagnetic instrument, which comprises:

a planning unit configured to plan for position information of survey lines and survey points and download the position information to an aircraft in advance;

an acquisition unit configured to select the survey lines and one survey point among survey points planned in advance and acquire coordinate information of the survey point;

a control unit configured to control the aircraft to fly to physical geographic locations of the survey points according to the coordinate information of the survey points in conjunction with positioning information acquired in real time; and a projection unit configured to hover above the physical geographic locations of the survey points and project a predetermined indication mark to the ground;

wherein, the control unit is further configured to control the aircraft to fly to the physical geographic location of a survey point according to the coordinate information of the survey point in conjunction with positioning information acquired in real time, and control the projection unit to project a first type of predetermined indication mark to the ground continuously in the process of flight to guide the engineering staff to move forward; control the aircraft to hover above the physical geographic location of the survey point and control the projection unit to project a second type of predetermined indication mark to the ground to guide the engineering staff to deploy a data acquisition and recording device; control the aircraft to sequentially fly to deployment points of electric field sensors configured for the data acquisition and recording device and hover above the deployment points, and control the projection unit to project the second type of predetermined indication mark to the ground to guide the engineering staff to deploy the electric field sensors; and control the aircraft to sequentially fly to deployment points of magnetic field sensors configured for the data acquisition and recording device and hover above the deployment points, and control the projection unit to project the second type of predetermined indication mark to the ground to guide the engineering staff to deploy the magnetic field sensors.

Optionally, the apparatus further comprises:

a recording unit used by the aircraft to record position information of the data acquisition and recording devices, electric field sensors, and magnetic field sensors at all of the planned survey points after the arrangement.

In a third aspect, the present invention provides a system for arranging survey points in field operation with a ground electromagnetic instrument, which comprises:

an aircraft configured to select the survey lines and one survey point among survey points planned in advance and acquire coordinate information of the survey point, fly to the physical geographic location of the survey point according to the coordinate information of the survey point in conjunction with positioning information acquired in real time while projecting a first type of predetermined indication mark continuously to the ground in the process of flight, hover above the physical geographic location of the survey point and project a predetermined indication mark to the ground; and a remote manipulator configured to store the position information of survey lines and survey points planned in advance and download the position information to the aircraft.

Optionally, the aircraft comprises:

a satellite navigation module and an inertial navigation module configured to acquire geographic location information, a wireless communication module configured to communicate with the remote manipulator, and a projection module configured to project a specified mark to the ground in the marking process.

Optionally, the remote manipulator is a mobile terminal in which control software is installed, and the mobile terminal has a display screen, a communication port for wireless communication with the wireless communication module, and an operation port configured to receiving control commands inputted by a user.

Optionally, the aircraft further has a low power alarm module configured to send an alarm back to the remote manipulator when the aircraft is in shortage of power.

Optionally, the aircraft is a quad-rotor aircraft or hex-rotor aircraft.

It is seen from the above technical scheme: the embodiments of the present invention have the following advantages:

With the method, apparatus and system for arranging survey points in field operation with a ground electromagnetic instrument provided in the embodiments of the present invention, the position information of survey lines and survey points are planned and downloaded to an aircraft in advance; the survey lines and one survey point among survey points planned in advance is selected and the coordinate information of the survey point is acquired; the aircraft is controlled to fly to the physical geographic location of the survey point according to the coordinate information of the survey point in conjunction with positioning information acquired in real time; the aircraft hovers above the physical geographic location of the survey point and projects a predetermined indication mark to the ground; the detection instrument and electric field sensor are deployed at a first position indicated by the indication mark, and the magnetic field sensor is deployed at a second position; such a process is repeated till all of the planned survey points are arranged. Thus, automatic survey point positioning and orientation in field operation is realized, and the accuracy of positioning and orientation in field operation can be greatly improved, and the working efficiency can be improved remarkably.

DETAILED DESCRIPTION OF THE EMBODIMENTS

To enable those skilled in the art to understand the technical scheme of the present invention better, hereunder the technical scheme in the embodiments of the present invention will be described clearly and completely with reference to the accompanying drawings. Apparently, the embodiments described below are only some embodiments of the present invention, rather than all embodiments of the present invention. Those having ordinary skilled in the art can obtain other embodiments without expending creative labor, on the basis of the embodiments provided here; however, all those embodiments shall be deemed as falling into the scope of protection of the present invention.

The terms "first", "second", "third", and "fourth", etc. (if any) in the Description, Claims, and above-mentioned accompanying drawings of the present invention are intended to differentiate similar objects, and may not be necessarily used to describe a specific order or precedence. It should be understood that the data used in such a manner is interchangeable under appropriate situations, so that the embodiment described here can be implemented in an order besides the order illustrated or described here. Moreover, the terms "comprise" and "have" and any variant of them are intended to encompass non-exclusive inclusions, such as any processes, methods, systems, products or apparatuses that include a series of steps or units, not limited to the steps or units that are clearly listed; instead, such steps or units may include other steps or units that are not listed clearly or are intrinsic to those processes, methods, products, or apparatuses.

Figure 1:
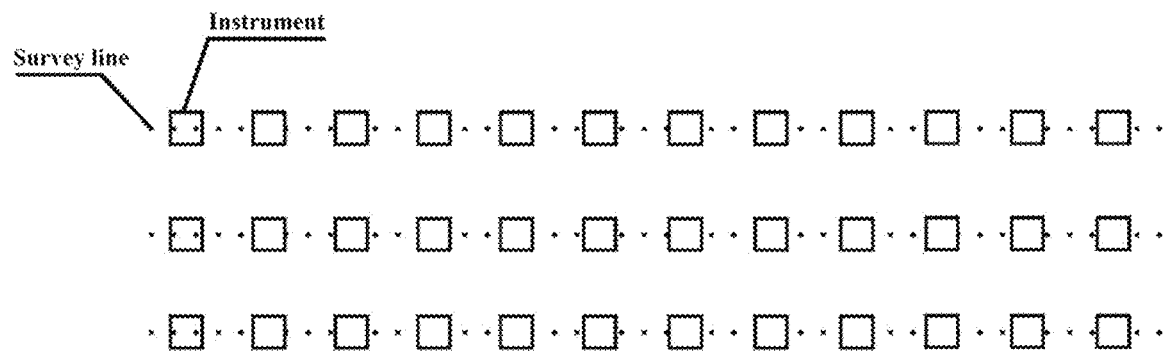
FIG. 1 is a schematic diagram of field arrangement of a ground electromagnetic instrument in the prior art.
Figure 2:
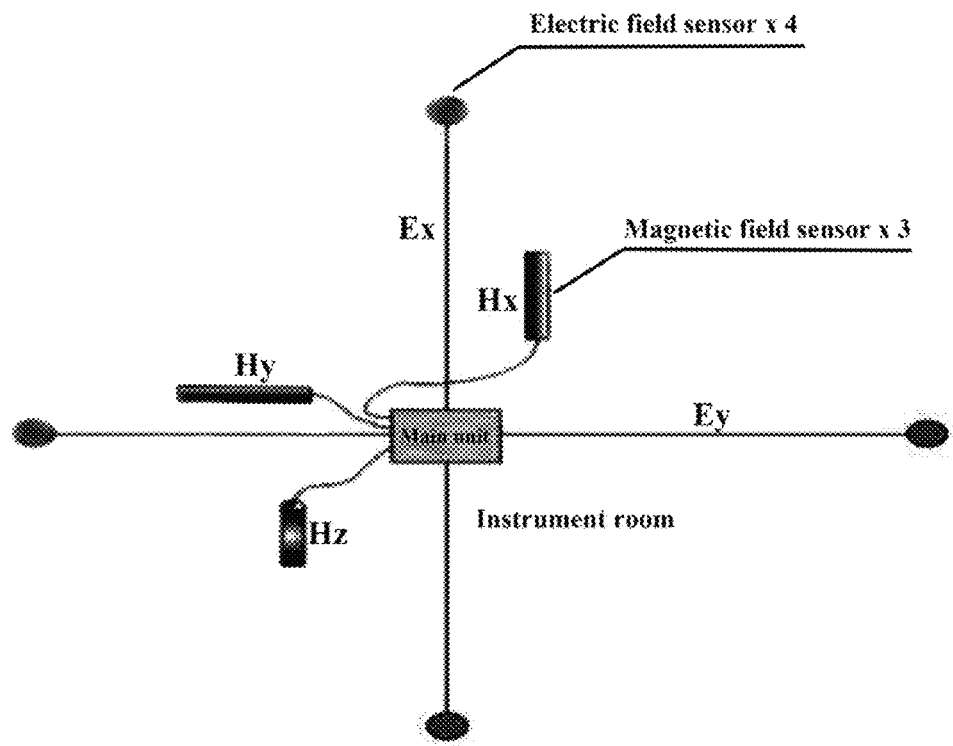
FIG. 2 is a schematic diagram of the sensor arrangement during measurement with a magnetotelluric method with a ground electromagnetic instrument in the prior art.
Figure 3:
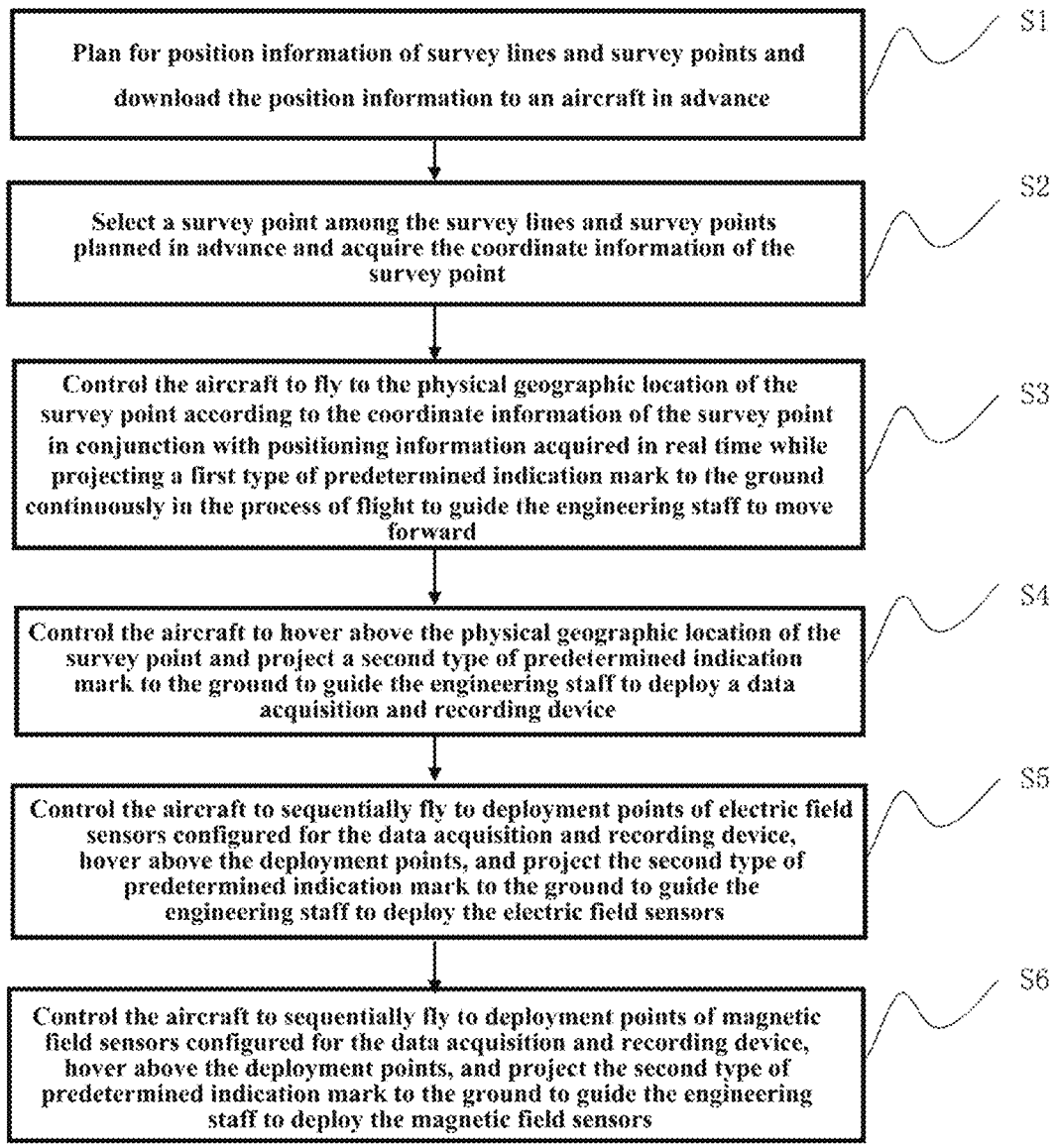
FIG. 3 is a flow diagram of the method for arranging survey points in field operation with a ground electromagnetic instrument in an embodiment of the present invention.

As shown in FIG. 3, a method for arranging survey points in field operation with a ground electromagnetic instrument, comprising:

S1. planning for position information of survey lines and survey points and downloading the position information to an aircraft in advance;

S2. selecting the survey lines and one survey point among survey points planned in advance, and acquiring coordinate information of the survey point;

S3. controlling the aircraft to fly to the physical geographic location of the survey point according to the coordinate information of the survey point in conjunction with positioning information acquired in real time while projecting a first type of predetermined indication mark to the ground continuously in the process of flight to guide the engineering staff to move forward;

S4. controlling the aircraft to hover above the physical geographic location of the survey point and project a second type of predetermined indication mark to the ground to guide the engineering staff to deploy a data acquisition and recording device;

S5. controlling the aircraft to sequentially fly to deployment points of electric field sensors configured for the data acquisition and recording device, hover above the deployment points, and project the second type of predetermined indication mark to the ground to guide the engineering staff to deploy the electric field sensors;

S6. controlling the aircraft to sequentially fly to deployment points of magnetic field sensors configured for the data acquisition and recording device, hover above the deployment points, and project the second type of predetermined indication mark to the ground to guide the engineering staff to deploy the magnetic field sensors; and S7. repeating the steps S2-S6, till all planned survey points are arranged.

Optionally, the method further comprises:

recording the position information of the data acquisition and recording devices, electric field sensors, and magnetic field sensors at all of the planned survey points, by the aircraft, after the arrangement.

Optionally, the first type of predetermined indication mark is a straight cursor configured to guide the engineering staff to move forward; the second type of predetermined indication mark is a cross cursor composed of two straight line segments that are different from each other in length, wherein, the straight line segment in greater length is used for differentiating the orientation, and the center point of the cross cursor is a positioning point; specifically, the second type of predetermined indication mark is configured to indicate that the detection instrument and the electric field sensors should be positioned at the center of the indication mark and the magnetic field sensors should be positioned in the direction of the straight line segment in greater length.

Specifically, with the method for arranging survey points in field operation with a ground electromagnetic instrument provided in the present invention, the specific implementation steps of the method for positioning of survey points and positioning and attitude determination of sensors in field operation are as follows:

S01. Indoor planning: in this stage, the engineering staff plan for the positions of survey lines and survey points, etc., and connection methods of sensors (including the quantity of sensors, spacing between electric field sensors and survey point, and placement of magnetic field sensors, etc.), create a work plan file, and download the work plan file to a remote manipulator;

S02. Plan importing: the engineering staff turn on the aircraft and remote manipulator after they reach to the operation field. The aircraft accomplishes positioning initialization autonomously. The engineering staff select survey lines, survey points, and sensor arrangement information via software in the remote manipulator, and transmit the information to the aircraft;

S03. Guide for survey point: the engineering staff select a survey point and start the aircraft, the latter activates a laser projection unit to project a visible straight cursor to the ground, and flies to the survey point at certain speed, so that the straight cursor serves as a guide signal to guide the engineering staff to move forward in the process of the flight;

S04. Sensor arrangement: the aircraft hovers above the survey point and projects a cross cursor after it guides the engineering staff to the survey point, and the engineering staff deploy the instrument at the center point of the cross cursor; 2) then the aircraft calculates its coordinates by itself according to the positions of the sensors planned in advance, and then sequentially guides the engineering staff to deploy electrical field sensors and magnetic field sensors, wherein, the electric field sensors are deployed at the center point of the cross cursor, while the magnetic field sensors are deployed in a direction that superposes one of the straight line segments (usually the longer straight line segment) of the cross cursor, and the levelness of the magnetic field sensors is measured by means of a level gauge;

S05. The steps S3 and S4 are repeated, till the arrangement of all survey points is accomplished;

S06. In the survey point arrangement process, the engineering staff may fine-tune the position of the cross cursor via the remote manipulator, so as to appropriately correct the positions and orientations of the instruments or sensors; the aircraft records the position information of all instruments and sensors for use in the subsequent data processing process.

With the method for arranging survey points in field operation with a ground electromagnetic instrument provided in the embodiments of the present invention, the position information of survey lines and survey points are planned and downloaded to an aircraft in advance; the survey lines and one survey point among survey points planned in advance is selected and the coordinate information of the survey point is acquired; the aircraft is controlled to fly to the physical geographic location of the survey point according to the coordinate information of the survey point in conjunction with positioning information acquired in real time; the aircraft hovers above the physical geographic location of the survey point and project a predetermined indication mark to the ground; the detection instrument and electric field sensor are deployed at a first position indicated by the indication mark, and the magnetic field sensor is deployed at a second position; such a process is repeated till all of the planned survey points are arranged. Thus, automatic survey point positioning and orientation in field operation is realized, and the accuracy of positioning and orientation in field operation can be greatly improved, and the working efficiency can be improved remarkably.

Figure 4:
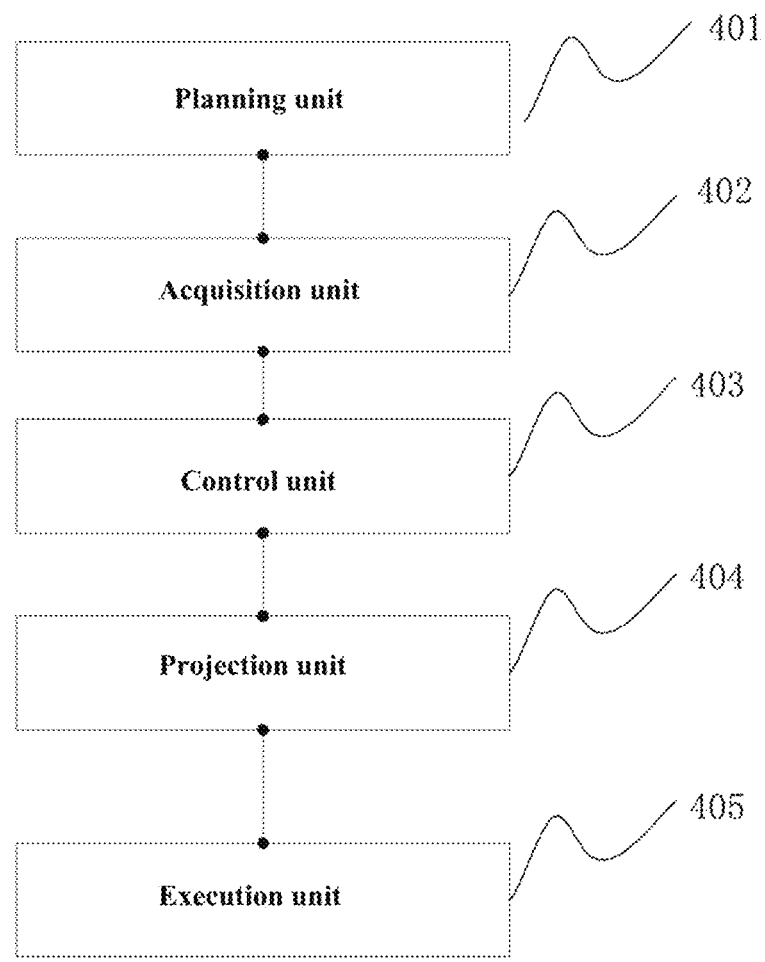
FIG. 4 is a structural block diagram of the apparatus for arranging survey points in field operation with a ground electromagnetic instrument in an embodiment of the present invention.

As shown in FIG. 4, an apparatus for arranging survey points in field operation with a ground electromagnetic instrument, comprising:

a planning unit 401 configured to plan for position information of survey lines and survey points and download the position information to an aircraft in advance;

an acquisition unit 402 configured to select the survey lines and one survey point among survey points planned in advance and acquire coordinate information of the survey point;

a control unit 403 configured to control the aircraft to fly to physical geographic locations of the survey points according to the coordinate information of the survey points in conjunction with positioning information acquired in real time;

a projection unit 404 configured to hover above the physical geographic locations of the survey points and project a predetermined indication mark to the ground;

the control unit 403 is further configured to control the aircraft to fly to the physical geographic location of a survey point according to the coordinate information of the survey point in conjunction with positioning information acquired in real time, and control the projection unit to project a first type of predetermined indication mark to the ground continuously in the process of flight to guide the engineering staff to move forward; control the aircraft to hover above the physical geographic location of the survey point and control the projection unit to project a second type of predetermined indication mark to the ground to guide the engineering staff to deploy a data acquisition and recording device; control the aircraft to sequentially fly to deployment points of electric field sensors configured for the data acquisition and recording device and hover above the deployment points, and control the projection unit to project the second type of predetermined indication mark to the ground to guide the engineering staff to deploy the electric field sensors; and control the aircraft to sequentially fly to deployment points of magnetic field sensors configured for the data acquisition and recording device and hover above the deployment points, and control the projection unit to project the second type of predetermined indication mark to the ground to guide the engineering staff to deploy the magnetic field sensors.

Optionally, the apparatus further comprises:

a recording unit 405 used by the aircraft to record position information of the detection instruments, electric field sensors, and magnetic field sensors at all of the planned survey points after the arrangement.

Optionally, the indication mark is a cross cursor composed of two straight line segments that are different from each other in length, wherein, the straight line segment in greater length is used for differentiating the orientation; the execution unit is specifically used to deploy the detection instrument and electric field sensors at the center of the indication mark and deploy the magnetic field sensors in the direction of the straight line segment in greater length; such a process is executed repeatedly, till the arrangement of all planned survey points is accomplished.

Figure 5:
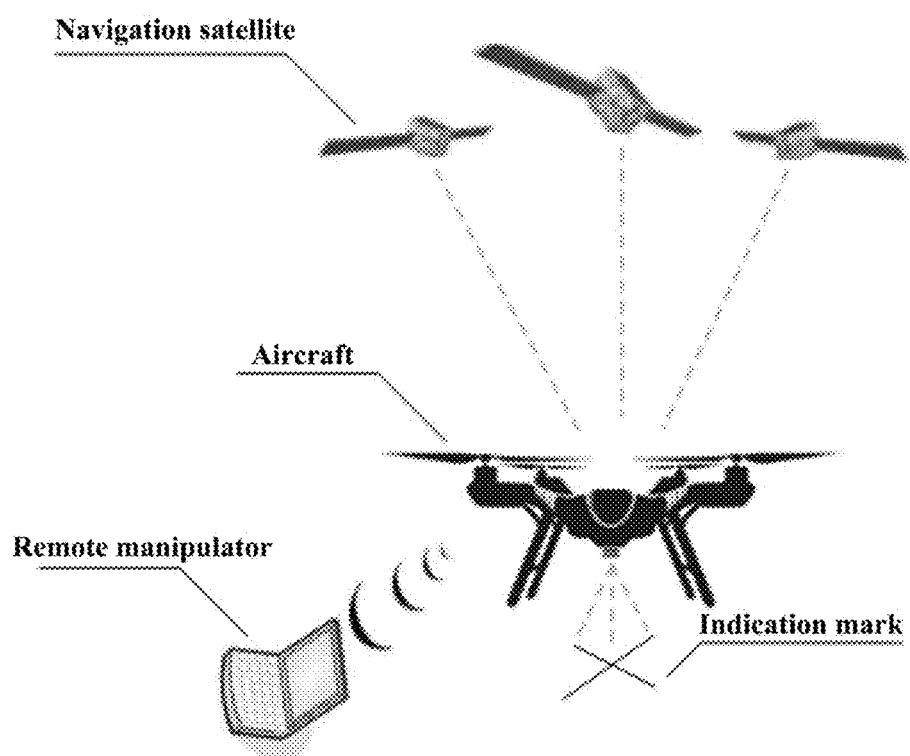
FIG. 5 is a schematic diagram of the system for arranging survey points in field operation with a ground electromagnetic instrument in an embodiment of the present invention.

As shown in FIG. 5, a system for arranging survey points in field operation with a ground electromagnetic instrument, comprising:

an aircraft configured to select the survey lines and one survey point among survey points planned in advance and acquire coordinate information of the survey point, fly to the physical geographic location of the survey point according to the coordinate information of the survey point in conjunction with positioning information acquired in real time, hover above the physical geographic location of the survey point and project a predetermined indication mark to the ground;

a remote manipulator configured to download the position information of survey lines and survey points planned in advance to the aircraft.

Optionally, the aircraft comprises:

a satellite navigation module and an inertial navigation module configured to acquire geographic location information, a wireless communication module configured to communicate with the remote manipulator, a projection module configured to project a specified mark to the ground in the marking process.

Optionally, the remote manipulator is a mobile terminal in which control software is installed, and the mobile terminal has a display screen, a communication port for wireless communication with the wireless communication module, and an operation port configured to receiving control commands inputted by a user.

Optionally, the aircraft further has a low power alarm module configured to send an alarm back to the remote manipulator when the aircraft is in shortage of power.

Optionally, the aircraft is a quad-rotor aircraft or hex-rotor aircraft.

The aircraft flies autonomously in an unmanned manner, is compact in size and light in weight (usually not heavier than 10 kg), convenient to carry for field work, equipped with high-precision satellite navigation system (GPS positioning and/or BeiDou positioning may be employed) and inertial navigation system (the navigation accuracy is at decimeter level), can fly to a specified coordinate point (survey point) autonomously and hover above the survey point, has a wireless communication function, and supports the engineering staff to set flight actions (start and hover, etc.) and parameters (speed, altitude, etc.), set the coordinate values of the target point of flight, etc., and read relevant parameters; the aircraft is equipped with a laser projection module to project a visible cross cursor to the ground, wherein, the two straight line segments of the cross cursor are different from each other in length to differentiate the orientation; the aircraft can rotate the cross cursor to ensure a line superposes the direction specified by the engineering staff; the aircraft works with a remote manipulator, which may be a computer or a special device, and the core functions of the remote manipulator are to communicate with the aircraft by wireless communication, run special control software, set the flight actions (start/stop, etc.) and parameters (speed, altitude, etc.) of the aircraft remotely, and set the coordinate values of the target point of flight, etc., and acquire relevant parameters and display the parameters on the display screen. Besides the wireless communication unit and display screen, etc., the remote manipulator further has necessary communication ports (e.g., USB interfaces) and operating ports (for touch screen, keyboard, and mouse) to facilitate the user to operate.

The special control software running in the remote manipulator controls the entire survey point arrangement operation in the field operation, including guide for survey point, and sensor deployment, etc., so as to realize automatic survey point positioning and orientation in the field operation; thus, the accuracy of survey point positioning and orientation in the field operation can be greatly improved, and the working efficiency can be improved remarkably.

Those skilled in the art can clearly understand: for the convenience and concision of description, the specific operating processes of the system, apparatus and units described above may be understood with reference to the corresponding process in the embodiments of the method described above, and are not iterated here.

It should be understood that the system, apparatus and method disclosed in the embodiments provided in the present application may be implemented in other ways. For example, the embodiment of the apparatus described above is only exemplary. For example, the division of the units is only a logic function division, and may be implemented in other ways in the actual implementation. For example, a plurality of units or components may be combined or integrated into another system, or some features may be neglected or not implemented. Besides, the illustrated or discussed coupling or direct coupling or communication connection between the devices or units may be implemented via some interfaces, and the indirect coupling or communication connection between the devices or units may be electrical, mechanical, or in other forms.

The units that are described as separate components may be or not be separated physically, and the components illustrated as units may be or not be physical units, i.e., they may be located at one place or distributed to a plurality of network elements. A part of or all of the units may be selected according to the actual requirement to attain the object of the scheme in the embodiments.

In addition, the functional units in the embodiments of the present invention may be integrated in one processing unit or exist as physically separate units, and two or more units may be integrated in one unit. The above-mentioned integrated units may be implemented in the form of hardware or software functional units.

Those having ordinary skills in the art should understand that all or a part of the steps of the methods in the above-mentioned embodiments may be accomplished by instructing relevant hardware with a program that may be stored in a computer-readable storage medium, which may include: Read Only Memory (ROM), Random Access Memory (RAM), magnetic disk, or optical disk, etc.

While the method, apparatus and system for arranging survey points in field operation with a ground electromagnetic instrument provided in the present invention are described above in detail, those having ordinary skills in the art may make modifications to the specific embodiments and application scopes on the basis of the idea in the embodiments of the present invention. In summary, the content of the specification shall not be interpreted as constituting any limitation to the present invention.

The invention claimed is:

1. A system for arranging survey points in field operation with a ground electromagnetic instrument, comprising:
   a planning unit configured to plan for position information of survey lines and survey points and download the position information to an aircraft in advance;
   an acquisition unit configured to select the survey lines and one survey point among survey points planned in advance and acquire coordinate information of the survey point;
   a control unit configured to control the aircraft to fly to physical geographic locations of the survey points according to the coordinate information of the survey points in conjunction with positioning information acquired in real time; and
   a projection unit configured to hover above the physical geographic locations of the survey points and project a predetermined indication mark to the ground;
   an aircraft configured to select survey lines and one survey point among survey points planned in advance and acquire coordinate information of the survey point, fly to a physical geographic location of the survey point according to the coordinate information of the survey point in conjunction with positioning information acquired in real time while projecting a first type of predetermined indication mark continuously to the ground in the process of flight, hover above the physical geographic location of the survey point and project a second type of predetermined indication mark to the ground; and
   a remote manipulator configured to store the position information of survey lines and survey points planned in advance and download the position information to the aircraft,
   wherein the planning unit, the acquisition unit, and the projection unit are disposed on the aircraft, and the control unit is disposed on the remote manipulator wherein, the control unit is further configured to control the aircraft to fly to the physical geographic location of a survey point according to the coordinate information of the survey point in conjunction with positioning information acquired in real time, and control the projection unit to project a first type of predetermined indication mark to the ground continuously in a process of flight to guide an engineering staff to move forward; control the aircraft to hover above the physical geographic location of the survey point and control the projection unit to project a second type of predetermined indication mark to the ground to guide the engineering staff to deploy a data acquisition and recording device; control the aircraft to sequentially fly to deployment points of electric field sensors configured for the data acquisition and recording device and hover above the deployment points, and control the projection unit to project the second type of predetermined indication mark to the ground to guide the engineering staff to deploy the electric field sensors; and control the aircraft to sequentially fly to deployment points of magnetic field sensors configured for the data acquisition and recording device and hover above the deployment points, and control the projection unit to project the second type of predetermined indication mark to the ground to guide the engineering staff to deploy the magnetic field sensors.

2. The system according to claim 1, wherein, the aircraft comprises:
   a satellite navigation module and an inertial navigation module configured to acquire geographic location information,
   a wireless communication module configured to communicate with the remote manipulator, and
   a projection module configured to project a specified mark to the ground in a marking process.

3. The system according to claim 1, wherein, the remote manipulator is a mobile terminal in which control software is installed, and the mobile terminal has a display screen, a communication port for wireless communication with the wireless communication module, and an operation port configured to receiving control commands inputted by a user.

4. The system according to claim 1, wherein, the aircraft further has a low power alarm module configured to send an alarm back to the remote manipulator when the aircraft is in shortage of power.

5. The system according to claim 1, wherein, the aircraft is a quad-rotor aircraft or hex-rotor aircraft.

6. The system according to claim 2, wherein, the aircraft further has a low power alarm module configured to send an alarm back to the remote manipulator when the aircraft is in shortage of power.

7. A method for arranging survey points in field operation with a ground electromagnetic instrument using the system of claim 1, comprising the following steps:
   S1. planning for position information of survey lines and survey points and downloading the position information to an aircraft in advance;
   S2. selecting the survey lines and one survey point among survey points planned in advance, and acquiring coordinate information of the survey point;
   S3. controlling the aircraft to fly to the physical geographic location of the survey point according to the coordinate information of the survey point in conjunction with positioning information acquired in real time while projecting a first type of predetermined indication mark to the ground continuously in the process of flight to guide an engineering staff to move forward;
   S4. controlling the aircraft to hover above the physical geographic location of the survey point and project a second type of predetermined indication mark to the ground to guide the engineering staff to deploy a data acquisition and recording device;
   S5. controlling the aircraft to sequentially fly to deployment points of electric field sensors configured for the data acquisition and recording device, hover above the deployment points, and project the second type of predetermined indication mark to the ground to guide the engineering staff to deploy the electric field sensors;
   S6. controlling the aircraft to sequentially fly to deployment points of magnetic field sensors configured for the data acquisition and recording device, hover above the deployment points, and project the second type of predetermined indication mark to the ground to guide the engineering staff to deploy the magnetic field sensors; and
   S7. repeating the steps S2-S6, till all planned survey points are arranged.

8. The method according to claim 7, further comprising:
   recording position information of the data acquisition and recording devices, the electric field sensors, and the magnetic field sensors at all of the planned survey points, by the aircraft, after the arrangement.

9. The method according to claim 8, wherein, the first type of predetermined indication mark is a straight cursor configured to guide the engineering staff to move forward; the second type of predetermined indication mark is a cross cursor composed of two straight line segments that are different from each other in length, wherein, the straight line segment in greater length is used for differentiating the orientation, and a center point of the cross cursor is a positioning point; specifically, the second type of predetermined indication mark is configured to indicate that the detection instrument and the electric field sensors should be positioned at the center of the indication mark and the magnetic field sensors should be positioned in the direction of the straight line segment in greater length.

* * * * *